United States Patent [19]

Costa

[11] Patent Number: 5,213,124

[45] Date of Patent: May 25, 1993

[54] PRESSURE-ACTUATED VALVE

[75] Inventor: Robert B. Costa, Covina, Calif.

[73] Assignee: Thompson Manufacturing Company, Chino, Calif.

[21] Appl. No.: 419,119

[22] Filed: Oct. 10, 1989

[51] Int. Cl.⁵ .................. F16K 31/385; F16K 31/40
[52] U.S. Cl. ........................................ 137/1; 137/269; 137/244; 251/30.02; 251/43
[58] Field of Search ................... 137/244, 269, 1; 251/30.02, 46, 43

[56] References Cited

U.S. PATENT DOCUMENTS

| | | | |
|---|---|---|---|
| 3,112,094 | 11/1963 | Nees et al. | 251/30.02 |
| 3,367,621 | 2/1968 | Griswold. | |
| 3,459,403 | 8/1969 | Royer | 251/46 X |
| 3,556,464 | 1/1971 | Griswold | 251/120 |
| 3,741,242 | 6/1973 | Hansen et al. | 137/269 X |
| 4,105,186 | 8/1978 | Eby | 251/30.02 X |
| 4,135,696 | 1/1979 | Saarem et al. | 251/30.02 |
| 4,206,901 | 6/1980 | Williams. | |

FOREIGN PATENT DOCUMENTS 50045 9/1911 Austria .............................. 137/244

Primary Examiner—Arnold Rosenthal
Attorney, Agent, or Firm—Harold L. Jackson

[57] ABSTRACT

A pressure actuated valve having a diaphragm assembly for receiving any one of a plurality of interchangeable restrictor elements of varying passageway diameter for changing the rate of valve closure and for servicing clogged passageways is disclosed. The valve employs a restrictor element having a selected inlet port diameter with a metering pin slidably mounted therethrough. The diaphragm assembly provides a slidable mounting for the restrictor element to enhance the cleaning action of the metering pin. A method of adjusting the rate of valve closure and servicing clogged or worn restricted inlet ports in such valves is also disclosed.

7 Claims, 3 Drawing Sheets

PRESSURE-ACTUATED VALVE

BACKGROUND OF THE INVENTION

The present invention is directed to a pressure-actuated valve which can be easily modified after installation to adjust the rate of valve operation. The valve is particularly suited for applications involving irrigation systems where clogging by foreign matter in the fluid or variations in supply line fluid pressure require servicing of a restricted inlet port to a valve actuating chamber.

Pressure-actuated valves frequently include a restricted inlet port which transmits a portion of a fluid or gas from the supply line to an actuating chamber for positioning a valve closure member. A vent port from the actuating chamber directs fluid to a control pilot valve for venting to a low pressure area. Because the vent port has a greater capacity than the restricted inlet port, when the control pilot valve is opened, the main valve opens.

Pressure-actuated valves of the prior art, as shown for example, in Griswold, U.S. Pat. No. 3,367,621, and in Williams, U.S. Pat. No. 4,206,901, the disclosures of each of which are hereby incorporated by reference, typically employ a restricted inlet port between the valve input chamber and the valve actuating chamber which is sufficiently small to slow movement of the valve closure member so as to eliminate water hammer and objectionable surge pressures in the supply line. Such restricted passageways, however, are sufficiently small as to be impaired by small particles suspended in the fluid passing into the valve. Such narrow passageways are also sufficiently small as to alter the desired valve closure speed as a result of a changed line fluid pressure condition at the valve site. A modest increase of pressure at a valve site may accelerate valve closure to a rate which creates water hammer and surge pressures in the line. Such a condition, if permitted to continue, can eventually result in excessive wear and tear to the supply line, valves and other line components. Alternatively, a modest decrease in pressure at a valve site may unacceptably slow or prevent valve closure.

SUMMARY OF THE INVENTION

The present invention is directed to a pressure-actuated valve which solves the aforementioned deficiencies of the prior art in a mutually compatible manner. The need for a restricted passageway to a valve actuating chamber which is resistent to clogging is satisfied by employing an inlet port having a metering pin slidably mounted therethrough. The action of the metering pin caused by reasons of fluctuations in line pressure and the turbulence of fluid, particularly at the passageway entrance, serves to dislodge accumulated particles or deposits at the passageway entrance.

The need for a pressure-actuated valve whose rate of closure can be easily adapted or fine tuned to conditions on site without costly removal and replacement of the entire valve is satisfied by providing a diaphragm assembly which can receive any one of plurality of interchangeable restrictor elements of different inlet port diameter. Similarly, the need for such a valve which can be easily serviced in the event of inlet port blockage is achieved by such restrictor element interchangability combined with a valve housing design which provides for simple access to the diaphragm assembly within the valve interior.

The foregoing and other objectives, features, and advantages of the present invention will be more readily understood upon consideration of the following detailed description of the invention taken in conjunction with the accompanying drawings.

DESCRIPTION OF THE PREFERRED EMBODIMENT

Figure 1:
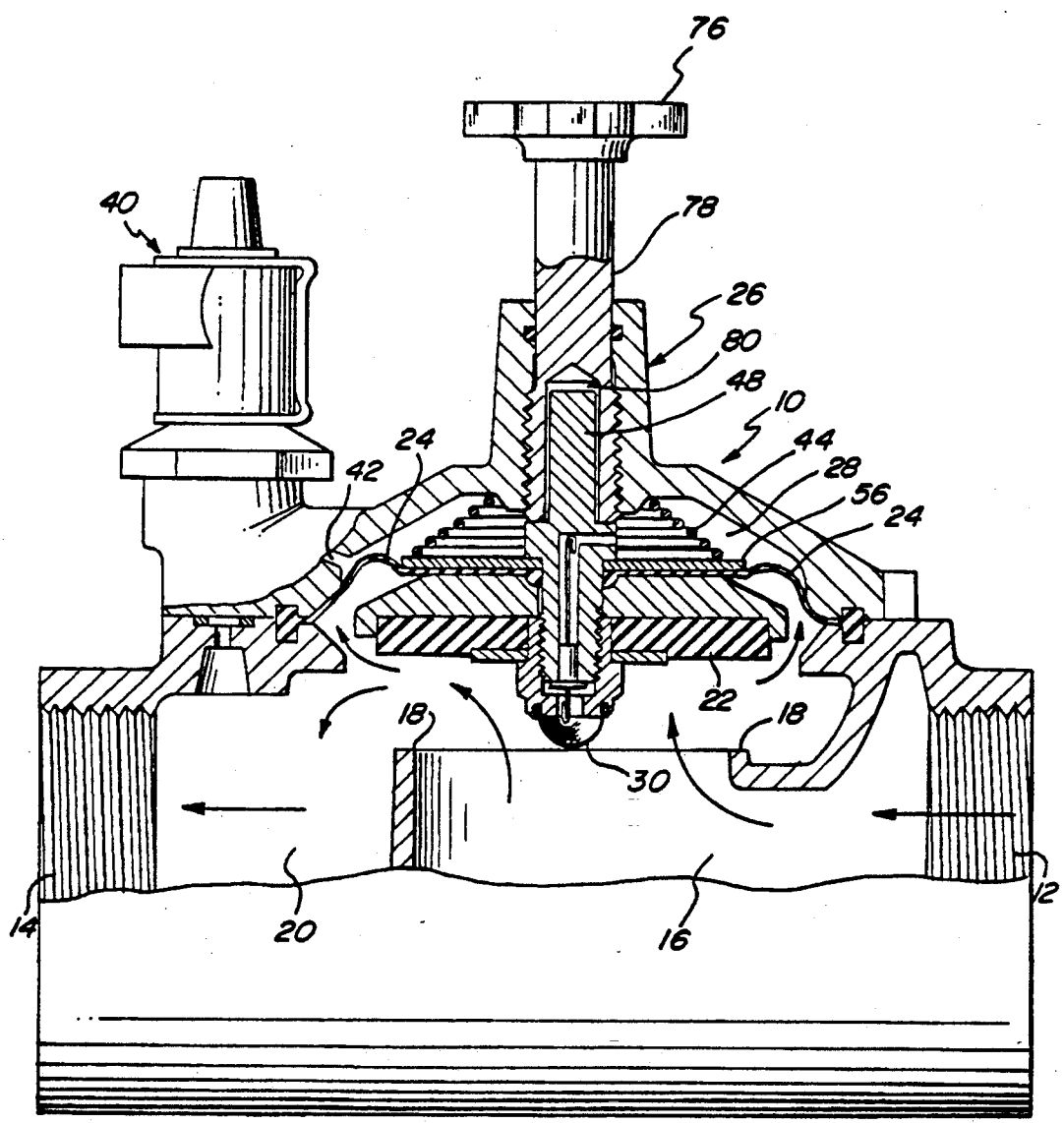
FIG. 1 is a cross-sectional view of a preferred embodiment of the pressure-actuated valve of the present invention with the valve parts shown in an opened position.
Figure 2:
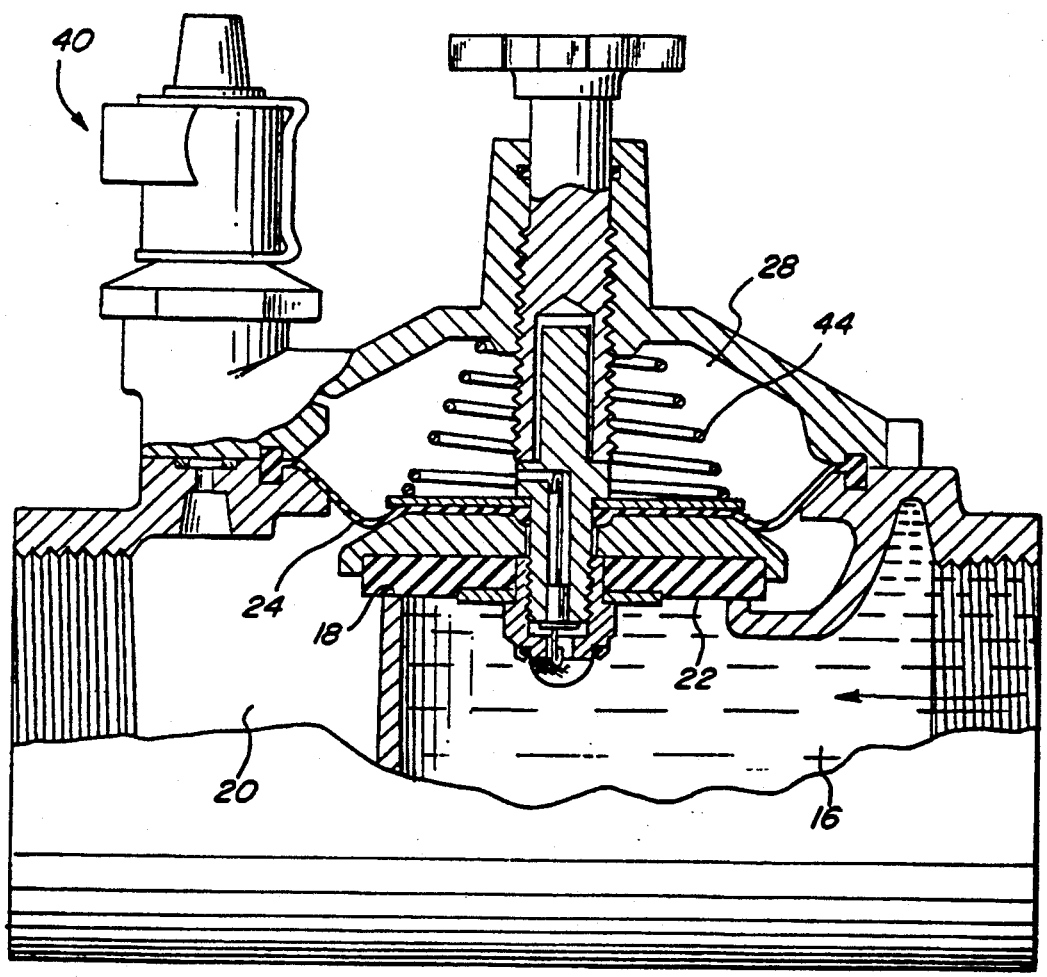
FIG. 2 is a cross-sectional view of a preferred embodiment of the pressure-actuated valve of the present invention with the valve parts shown in a closed position.

Referring to the drawings, a preferred embodiment of the present invention is shown in FIGS. 1 and 2 as comprising a pressure-actuated valve 10 for controlling the flow of fluid through a supply line. The valve 10 couples to a fluid supply line through a conventional coupling means 12 on its upstream side and through a conventional coupling means 14 on its downstream side. When the valve is open, as shown in FIG. 1, fluid will flow from the supply line into input chamber 16, pass the closure seat 18 and enter the output chamber 20. When the valve is closed, as shown in FIG. 2, fluid flow in the supply line will be stopped by the engagement of closure member 22 with seat 18 thereby preventing fluid from entering output chamber 20.

Figure 3:
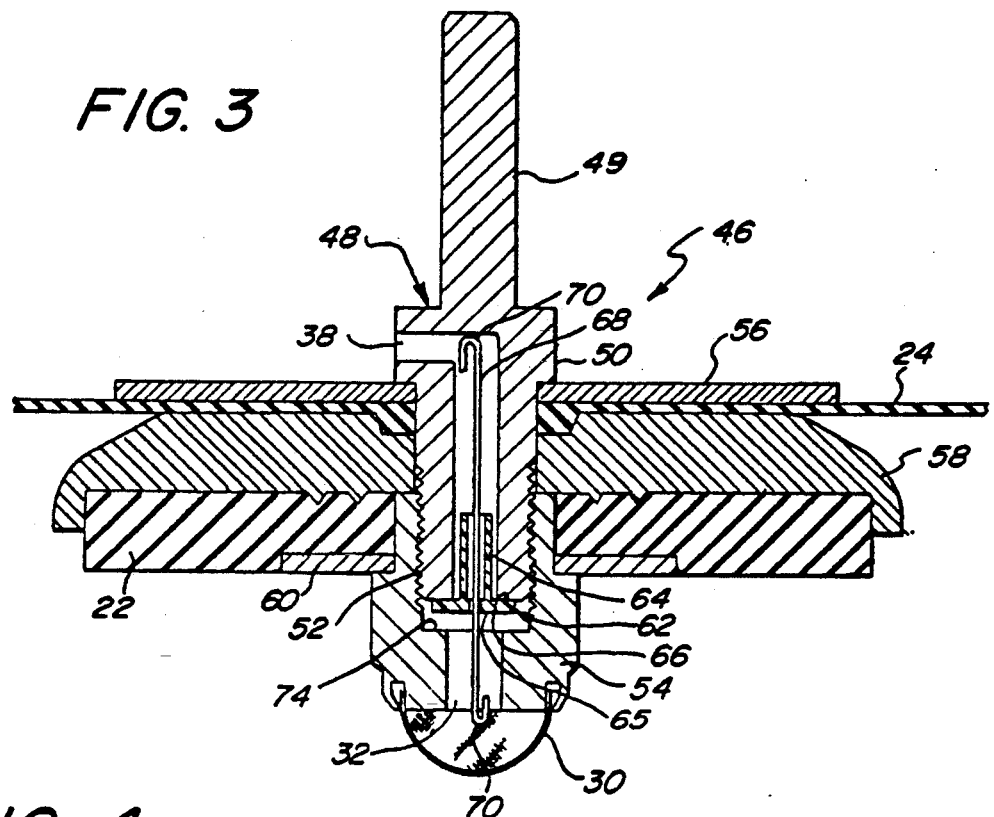
FIG. 3 is an enlarged sectional view showing the constructional details of the diaphragm assembly of the preferred embodiment of FIGS. 1 and 2.
Figure 4:
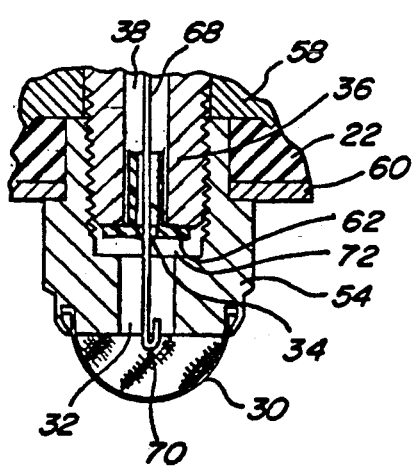
FIG. 4 is a fragmentary cross-sectional view isolated on the restrictor element assembly of the pressure-actuated valve of FIGS. 1, 2 showing one embodiment of a restrictor element assembly of larger inlet port diameter.

Valve closure member 22 is coupled to the body of the pressure actuated valve 10 by means of a flexible resilient diaphragm 24. The diaphragm 24 and the interior of bonnet assembly 26 form an actuating chamber 28. As best seen in FIGS. 3 and 4, fluid is free to flow from the input chamber 16 through filter screen 30, into orifice 32, into restricted inlet port 34, up restrictor element bore 36 and through shaft duct 38 into actuating chamber 28. Referring again to FIG. 1, fluid will flow through this series of passageways when a pilot valve in solenoid assembly 40 is opened allowing fluid to flow from chamber 28 into vent port 42, through the pilot valve in solenoid assembly 40 and into output chamber 20 or other lower pressure area.

When the pilot valve in assembly 40 is closed, fluid is prevented from venting from the actuating chamber 28 to a lower pressure area. Pressure in the chamber 28 will then increase thereby forcing valve closure member 22 toward seat 18. As the pressure in chamber 28 approaches that of input chamber 16, the member 22 is forced onto the seat 18. The resistance of the upstream pressure is overcome by means of the additional opposing force of valve spring 44. Referring to FIG. 2, the surface area of diaphragm 24 being greater than the portion of closure member 22 facing input chamber 16 results in a net closure force for retaining closure member 22 against seat 18 in response to surges in upstream pressure.

The speed of movement of closure member 22 toward its seat 18 is controlled by the flow capacity of restricted inlet port 34. If the unobstructed cross-sectional area of this opening is too large, the rapid movement of valve closure member 22 onto its seat 18 will result in pressure shock and hammering in the supply line. If the cross-sectional area is too small, the movement of the plug member 22 toward its seat 18 will be undesirably slow and prone to frequent clogging by foreign matter passing through screen 30.

Referring to FIG. 3, the diaphragm assembly 46 includes a shaft 48 having a shaft stem 49, intermediate bolt portion 50, and threaded end 52 for mating engagement with orifice nut 54. A plate 56, diaphragm 24, spacer 58, plug member 22, and washer 60 are securely mounted to the shaft 48 between bolt portion 50 and orifice nut 54. The shaft 48 includes a shaft duct 38 providing a passageway between orifice 32 and the exterior of bolt portion 50.

A flow restrictor element assembly 62 for controlling fluid flow to actuating chamber 28 includes a shank portion 64 for insertion into the input chamber side of shaft duct 38 and includes a head portion 65 of greater cross-sectional area than the shank portion 64 so as to define a shoulder 66 for engagement with the input chamber end of shaft 48. The shank portion 64 may be of sufficient cross-sectional area to provide for a slidable engagement with the interior of shaft duct 38, as shown in FIG. 4. The head portion 65 includes a restricted inlet port 34 which communicates with a larger diameter restrictor element bore 36.

A metering pin 68 is slidably mounted through inlet port opening 34 and bore 36 to form assembly 62. The metering pin is bent proximate each end to form U-shaped ends 70. Prior to installation into diaphragm assembly 46, the ends 70 serve to prevent loss of the metering pin from the restrictor element assembly 62. The U-shaped ends also present an asymmetrical surface area to turbulent fluid flow thereby increasing the desired cleaning action of the metering pin, particularly at the restricted inlet port 34. This cleaning action is further enhanced by the freedom of the flow restrictor element assembly 62, in response to supply line pressure variations, to slide axially within a gap 72, which is shorter than the axial length of element assembly 62, formed between the internal shoulder 74 of orifice nut 54 and the input chamber end of shaft 48. The selection of a greater diameter for restrictor element bore 36 than that of inlet port 34 serves to increase the nonaxial component of movement of metering pin 68.

Figure 5:
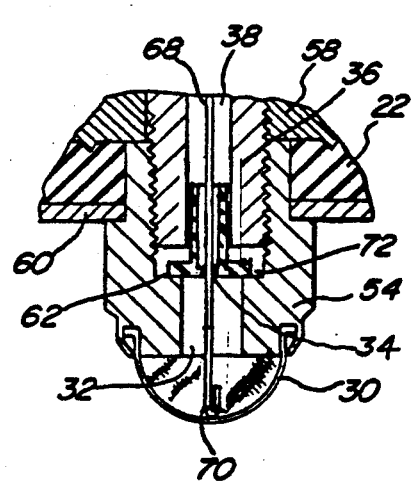
FIG. 5 is a fragmentary cross-sectional view isolated on the restrictor element assembly of the pressure-actuated valve of FIGS. 1, 2 and 3 showing a restrictor element assembly of smaller inlet port diameter at an alternative rest position with the main valve closed.

In the event of wear or clogging of inlet port 34, the restrictor element assembly 62 is easily removed and inexpensively replaced. The element assembly 62 is accessed by opening the bonnet assembly 26, removing the diaphragm assembly 46, and removing orifice nut 54 from the shaft 48. The element assembly 62 is easily slid from shaft duct 38 and a replacement element inserted. Similarly, the rate of valve closure can be easily modified after valve installation by replacing the element assembly 62 with a flow restrictor element having an inlet port 34 of larger open cross-sectional area, as shown in FIG. 4, to increase valve closure speed, or with a replacement element assembly 62 having a smaller open cross-sectional area port inlet opening, as shown in FIG. 5, to slow valve closure speed. The inlet port open cross-sectional area can, of course, be changed by varying the gauge of the metering pin or varying the inlet port diameter or both. The interchangeable element assemblies 62 of varying inlet port open cross-sectional area are preferably colored coded or are given other indicia of their respective inlet port open cross-sectional area size so as to facilitate selection during servicing from a supply of assorted sizes. As is illustrated in FIGS. 3, 4, and 5 the interchangeable restrictor elements 62 are color coded with the colors representative of the diameters (and cross-sectional areas) of the inlet port openings e.g., restrictor element 62 of FIG. 3 is colored green, the element 62 of FIG. 4 is colored red and the element 62 of FIG. 5 is colored black.

In customarily encountered irrigation applications using valves of 1 inch to 2 inch pipe sizes, where the supplied fluid is water, a restricted inlet port opening having a diameter within the range of about 0.019 to 0.031 inches with a metering pin having a gauge of about 0.016 inches has been found to provide desirable valve performance.

The pressure-actuated valve 10 also includes a manual control 76 for operation when the actuating chamber 28 is allowed to vent to a low pressure area. When operated, the manual control drives slide 78 against shaft 48 thereby moving closure member 22 toward seat 18. Chamber 80 slidably receives the shaft 48 as slide 78 lowers into actuating chamber 28.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What is claimed is:

1. A pressure-actuated valve comprising:
   a valve body defining an inlet chamber, and outlet chamber and a valve seat therebetween;
   a flexible diaphragm assembly secured to said valve body so as to define an actuating chamber;
   said diaphragm assembly including closure means for cooperation with said valve seat;
   means for controlled venting from said actuating chamber;
   a restrictor element having an inner end and an outer end and defining a bore therebetween;
   said diaphragm assembly having means for receiving and removably retaining said restrictor element so as to position said inner end in communication with said actuating chamber and said outer end in communication with said inlet chamber;
   said restrictor element including a metering pin slidably mounted to said restrictor element through said bore, said pin having a bend at one end thereof to provide an asymmetrical surface area.

2. A method of changing the rate of closure of a pressure actuated diaphragm valve comprising:
   providing a plurality of restrictor elements, each defining a bore with a metering pin slidably mounted therethrough and with each having an inlet port to said bore of a different open cross-sectional area;

providing a flexible diaphragm assembly having means for receiving and removably retaining a selected one of said restrictor elements;

removing a restrictor element from said diaphragm assembly; and installing a restrictor element having an inlet port of different open cross-sectional area.

3. A method of servicing the inlet port to the actuating chamber of a pressure-actuated valve comprising:

providing a supply of interchangeable restrictor elements, each defining an inlet port with a metering pin slidably mounted therethrough of different open cross-sectional area and each having indicia of the respective size of said open cross-sectional area;

providing an actuating chamber having means for receiving and removably retaining one of said restrictor elements;

removing a restrictor element from said diaphragm assembly;

and installing a selected one of said restrictor elements from said supply.

4. A pressure-actuated valve comprising:

a valve body having an actuating chamber;

a plurality of interchangeable restrictor elements, each defining an inlet port;

said restrictor elements each including a metering pin slidably mounted through said port so as to define a respective open cross-sectional area;

each one of said restrictor elements including indicia of the size of said respective open cross-sectional area;

and said actuating chamber having means for receiving and removably retaining a selected one of said restrictor elements so as to provide a restricted passageway to said chamber.

5. The method of claim 2 wherein the inlet ports of the restrictor elements have diameters within the range of about 0.019 to 0.031 inches and wherein the restrictor elements are color coded with each color representing a restrictor element having an inlet port of a specific diameter.

6. The method of claim 3 wherein the indicia comprise different colors.

7. An interchangeable elements assembly for a pressure actuated valve having (1) a valve body defining an inlet chamber, an outlet chamber and a valve seat therebetween and (2) a flexible diaphragm assembly secured to the valve body for defining an actuating chamber, the diaphragm assembly having a duct for providing fluid communication between the valve inlet and the actuating chamber, the interchangeable elements assembly comprising:

at least three interchangeable restrictor elements adapted to be slidably received in said duct in the diaphragm assembly, each restrictor element providing an opening of a different total cross-sectional area within the range of about 0.00007 to 0.00055 square inches with one of the restrictor elements providing the larger opening and another element providing the smaller opening; and each of said restrictor elements including a metering pin slidably mounted in said inlet port and indicia representative of the size of said respective cross-sectional area.

* * * * *